(12) United States Patent
Ando et al.

(10) Patent No.: US 11,481,611 B2
(45) Date of Patent: Oct. 25, 2022

(54) RRAM CROSSBAR ARRAY STRUCTURE FOR MULTI-TASK LEARNING

(71) Applicant: International Business Machines Corporation, Armonk, NY (US)

(72) Inventors: Takashi Ando, Tuckahoe, NY (US); Reinaldo Vega, Mahopac, NY (US); Hari Mallela, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 16/178,627

(22) Filed: Nov. 2, 2018

(65) Prior Publication Data

US 2020/0143233 A1 May 7, 2020

(51) Int. Cl.
*G06N 3/063* (2006.01)
*G06N 3/08* (2006.01)
*G06N 3/04* (2006.01)

(52) U.S. Cl.
CPC ............ *G06N 3/063* (2013.01); *G06N 3/04* (2013.01); *G06N 3/08* (2013.01)

(58) Field of Classification Search
CPC ............ G06N 3/04; G06N 3/08; G06N 3/063
See application file for complete search history.

(56) References Cited

U.S. PATENT DOCUMENTS

| | | | |
|---|---|---|---|
| 9,466,362 B2 | 10/2016 | Yu et al. | |
| 9,710,747 B2 | 7/2017 | Kang et al. | |
| 2014/0201126 A1* | 7/2014 | Zadeh | A61B 5/165 706/52 |
| 2014/0257805 A1* | 9/2014 | Huang | G06N 3/0454 704/232 |
| 2015/0161522 A1* | 6/2015 | Saon | G06N 3/0454 706/12 |
| 2016/0125287 A1 | 5/2016 | Pantazi et al. | |
| 2017/0011290 A1 | 1/2017 | Taha et al. | |
| 2017/0061281 A1* | 3/2017 | Gokmen | G06N 3/084 |
| 2017/0109626 A1* | 4/2017 | Gokmen | G06N 3/0472 |
| 2017/0109628 A1* | 4/2017 | Gokmen | G06N 3/0472 |
| 2018/0018559 A1 | 1/2018 | Yakopcic et al. | |
| 2018/0067697 A1 | 3/2018 | Lee et al. | |
| 2018/0075338 A1* | 3/2018 | Gokmen | G06N 3/0454 |

(Continued)

OTHER PUBLICATIONS

Park, S., et al. "RRAM-based synapse for neuromorphic system with pattern recognition function." 2012 international electron devices meeting. IEEE, 2012: 10.2.1-10.2.4 (Year: 2012).*

(Continued)

*Primary Examiner* — Kamran Afshar
*Assistant Examiner* — Randall K. Baldwin
(74) *Attorney, Agent, or Firm* — Cantor Colburn LLP; Randall Bluestone (57) ABSTRACT

Provided are embodiments of a multi-task learning system with hardware acceleration that includes a resistive random access memory crossbar array. Aspects of the invention includes an input layer that has one or more input layer nodes for performing one or more tasks of the multi-task learning system, a hidden layer that has one or more hidden layer nodes, and a shared hidden layer that has one or more shared hidden layer nodes which represent a parameter, wherein the shared hidden layer nodes are coupled to each of the one or more hidden layer nodes of the hidden layer.

4 Claims, 7 Drawing Sheets

(56) References Cited

U.S. PATENT DOCUMENTS

| | | | |
|---|---|---|---|
| 2018/0095930 A1 | 4/2018 | Lu et al. | |
| 2018/0366107 A1* | 12/2018 | Huang | G10L 15/16 |
| 2019/0130275 A1* | 5/2019 | Chen | G06N 3/0454 |

OTHER PUBLICATIONS

Yu, Shimeng, et al. "A neuromorphic visual system using RRAM synaptic devices with sub-pJ energy and tolerance to variability: Experimental characterization and large-scale modeling." 2012 International Electron Devices Meeting. IEEE, 2012: 10.4.1-10.4.4 (Year: 2012).*

Chen, Dongpeng, et al. "Joint acoustic modeling of triphones and trigraphemes by multi-task learning deep neural networks for low-resource speech recognition." 2014 IEEE International Conference on Acoustics, Speech and Signal Processing (ICASSP). IEEE, 2014: 5593-5596 (Year: 2014).*

Gokmen, Tayfun, and Yurii Vlasov. "Acceleration of deep neural network training with resistive cross-point devices: Design considerations." Frontiers in neuroscience 10 (2016): 333: 1-13 (Year: 2016).*

Zhang, Yue, et al. "Multi-task deep neural network with shared hidden layers: Breaking down the wall between emotion representations." 2017 IEEE international conference on acoustics, speech and signal processing (ICASSP). IEEE, 2017: 4990-4994 (Year: 2017).*

Gokmen, Tayfun, Murat Onen, and Wilfried Haensch. "Training deep convolutional neural networks with resistive cross-point devices." Frontiers in neuroscience 11 (2017): 538: 1-13 (Year: 2017).*

Kendall, Alex, Yarin Gal, and Roberto Cipolla. "Multi-Task Learning Using Uncertainty to Weigh Losses for Scene Geometry and Semantics." arXiv preprint arXiv:1705.07115 (2017):1-13. (Year: 2017).*

Zhang, Qingtian, et al. "Sign backpropagation: An on-chip learning algorithm for analog RRAM neuromorphic computing systems." Neural Networks 108 (Sep. 1, 2018): 217-223. (Year: 2018).*

Tsai, Hsinyu, et al. "Recent progress in analog memory-based accelerators for deep learning." Journal of Physics D: Applied Physics 51.28 (Jun. 2018): 283001: 1-27 (Year: 2018).*

Reinaldo, Francisco Antonio Fernandes. Afranci: Multi-layer architecture for cognitive agents. Diss. Universidade do Porto (Portugal), 2010: i-177 (Year: 2010).*

Huang, Jui-Ting, et al. "Cross-language knowledge transfer using multilingual deep neural network with shared hidden layers." 2013 IEEE International Conference on Acoustics, Speech and Signal Processing. IEEE, 2013. (Year: 2013).*

Huang, Zhen, et al. "Rapid adaptation for deep neural networks through multi-task learning." Sixteenth Annual Conference of the International Speech Communication Association. 2015: 3625-3629 (Year: 2015).*

Georgiev, Petko, et al. "Low-resource multi-task audio sensing for mobile and embedded devices via shared deep neural network representations." Proceedings of the ACM on Interactive, Mobile, Wearable and Ubiquitous Technologies 1.3 (2017): 1-19. (Year: 2017).*

Wu, E., et al. "Fundamental limitations of existing models and future solutions for dielectric reliability and RRAM applications." 2017 IEEE International Electron Devices Meeting (IEDM). IEEE, 2017. (Year: 2017).*

Gong, Nanbo, et al. "Signal and noise extraction from analog memory elements for neuromorphic computing." Nature communications 9.1 (May 2018): 1-8. (Year: 2018).*

Alayan et al., "Self-Rectifying Behavior and Analog Switching under Identical Pulses Using Tri-Layer RRAM Crossbar Array for Neuromorphic Systems", 2017 IEEE International Memory Workshop (IMW); Year: 2017, pp. 1-4.

D. Ielmini, "Brain-inspired computing with resistive switching memory (RRAM): Devices, synapses and neural networks", Microelectronic Engineering 190 (2018) 44-53.

Hong et al., "Oxide-based RRAM materials for neuromorphic computing", Journal of Materials Science (2018) 53:8720-8746, vol. 53, No. 12, 20 pages.

Liao et al., "Weighted Synapses Without Carry Operations for RRAM-Based Neuromorphic Systems", Frontiers in Neuroscience, Mar. 2018, vol. 12, Article 167, 9 pages.

Ni et al., "On-line machine learning accelerator on digital RRAM-crossbar", 2016 IEEE International Symposium on Circuits and Systems (ISCAS), Year: 2016, pp. 113-116.

Woo et al., "Linking Conductive Filament Properties and Evolution to Synaptic Behavior of RRAM Devices for Neuromorphic Applications", IEEE Electron Device Letters; Year 2017, vol. 38, Issue 9, pp. 1220-1223.

Electronic Materials Research Laboratory, "Redox-based Tera-bit memories," http://www.emrl.de/r_a_1.html (retrieved Jan. 3, 2018), 10 pages.

Goodfellow et al., "Deep Learning.", 2016 MIT Press. (Year: 2016) pp. 1-777.

Wong et al., "Metal-Oxide RRAM," Proceedings of the IEEE, vol. 100, No. 6, Jun. 2012, pp. 1951-1970.

* cited by examiner

FIG. 6

RRAM CROSSBAR ARRAY STRUCTURE FOR MULTI-TASK LEARNING

BACKGROUND

The present invention generally relates to resistive memory systems, and more specifically to resistive random access memory crossbar array structures for multi-task learning.

Resistive random access memory (RRAM) is a nano-scale non-volatile memory (NVM). RRAM provides simple storage cell components, high density, low power, large endurance, fast write, read and erase speeds, and excellent scalability. A typical RRAM storage cell is two-terminal device formed as a metal-insulator-metal (MIM) structure. The insulator material can be a binary metal oxide, which makes the MIM storage cell compatible with silicon-based CMOS (complementary metal oxide semiconductor) fabrication process. When a sufficient electrical signal is applied across the metal electrodes of a MIM, the resistance of the insulator can be switched from one resistance state to another. The insulator retains its current resistance state until an appropriate electrical signal is applied across the metal electrodes to change it.

RRAM, along with the logic circuitry used to address, read and write individual RRAM cells, can be implemented in an array (e.g., a RRAM cell array), which is compatible with a variety of electronic circuits and devices, including neuromorphic architectures. Multiple pre-neurons and post-neurons can be connected through the array of RRAMs, which naturally expresses a fully-connected neural network. The density of RRAM can be increased by configuring the array as a three-dimensional (3D) vertical stack of addressable RRAM cells as practiced in Flash NAND technologies.

SUMMARY

Embodiments of the present invention are directed to a system for an RRAM crossbar array structure for multi-task learning. A non-limiting example of the system includes one or more processors, and at least one memory, the memory including instructions that, upon execution by at least one of the one or more processors. The system also includes an input layer having one or more input layer nodes for performing one or more tasks of the multi-task learning system, a hidden layer having one or more hidden layer nodes, and a shared hidden layer having one or more shared hidden layer nodes which represent a parameter, wherein the shared hidden layer nodes are coupled to each of the one or more hidden layer nodes of the hidden layer.

Embodiments of the invention are directed to a RRAM crossbar array structure for multi-task learning with hardware acceleration. The crossbar array structure includes one or more cross point devices coupled to a first pair of metal lines, wherein the first pair of metal lines is associated with a first task of the multi-task learning system, wherein a resistivity of each cross point device of the one or more cross point devices represent a parameter of a connection in the multi-task learning system, and a second pair of metal lines is associated with a second task of the multi-task learning system, wherein the first pair of metal lines is coupled to the second pair of metal lines.

Embodiments of the present invention are directed to a method for operating an RRAM crossbar array structure for multi-task learning. A non-limiting example of the method includes coupling an input layer to a shared hidden layer, wherein the input layer has one or more input nodes, wherein the shared hidden layer has one or more shared hidden layer nodes representing a parameter, and coupling the shared hidden layer to one or more hidden layers, wherein the one or more hidden layers has one or more hidden layer nodes. The method also includes coupling the one or more hidden layer nodes to an output layer, wherein the output layer has one or more output layer nodes, and predicting an output based on the one or more input layer nodes, one or more shared hidden layer nodes, and the one or more hidden layer nodes.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, processors and processing system have been used for executing machine-learning algorithms. Multi-task learning is a type of machine learning technique where multiple tasks are solved at the same time, while exploiting commonalities and differences across plurality of tasks. Machine learning models can be used to identify patterns of data. For example, the machine learning models can be used to identify malicious code used in frequently downloaded software. In another example, machine learning can be used by autonomous vehicles to help optimize obstacle recognition to avoid a collision. Other non-limiting examples for machine learning models include healthcare applications, financial application, etc. Multi-task learning uses both task specific parameters and general parameters to predict an outcome of the model. The task-specific parameters are associated with particular tasks among the plurality of tasks while the general parameters are shared among a plurality of tasks.

The various models are configured to collect and process the data to predict an output based on the identified patterns of the data. The patterns for each model can be determined by using techniques such as but not limited to clustering, classification, regressions, and other techniques that can optimize the prediction of the model.

The models can be implemented in software code where the data is received by an input layer, processed by a hidden layer, and results are provided to an output layer. Each layer includes a number of nodes that are configured to perform computations to predict an outcome for the model. Each of the nodes receives an input and combines it with in input.

In some multi-tasking scenarios, the same weights for the hidden layer nodes can be applied to a plurality of other hidden layer nodes of subsequent layers. The hidden layer nodes are nodes that neither see nor act upon the outside world directly. These nodes can represent inter-neurons that communicate only with other neurons and are used in predicting the output label of the model. A multi-tasking model is configured to perform a plurality of task simultaneously by receiving a plurality of inputs, passing the inputs to the hidden layer nodes, and providing the outputs to the plurality of output nodes. In conventional techniques implementing the multi-task machine learning architecture, the weights are stored in software and are accessed as it is needed. This increases the delay and reduces the performance of the analysis because each individual weight will have to be accessed during processing.

The shared representation is not physically shared and needs to be managed by software using conventional technologies (CPU, GPU based). For example, a general parameter such as a weight is stored in memory and must be individually communicated to one or more processors. This causes operational delay, increased power consumption, and footprint penalty.

Crossbar arrays are also used in high-density and high-speed non-volatile memory applications. The parameters can include weights/bias that can be configured as a resistivity in the crossbar array. The cross point devices can be configured in multi-level resistive states to represent the various weights.

Turning now to an overview of the aspects of the invention, one or more embodiments of the invention address the above-described shortcomings of the prior art by providing techniques to increase the efficiency of a machine learning models performance by configuring the shared weights for multi-task models in a hardware architecture. The weights are physically shared with one or more subsequent nodes and tasks. The resistivity of the RRAM can be configured to represent a weight associated with a node of the multi-task machine learning model that is being executed in a processor or processing system.

The above-described aspects of the invention address the shortcomings of the prior art by implementing and leveraging the physical connections between a RRAM crossbar array structure that stores a plurality of weights with a plurality of nodes/tasks in the multi-task learning model to increase the performance of the model.

Figure 1A:
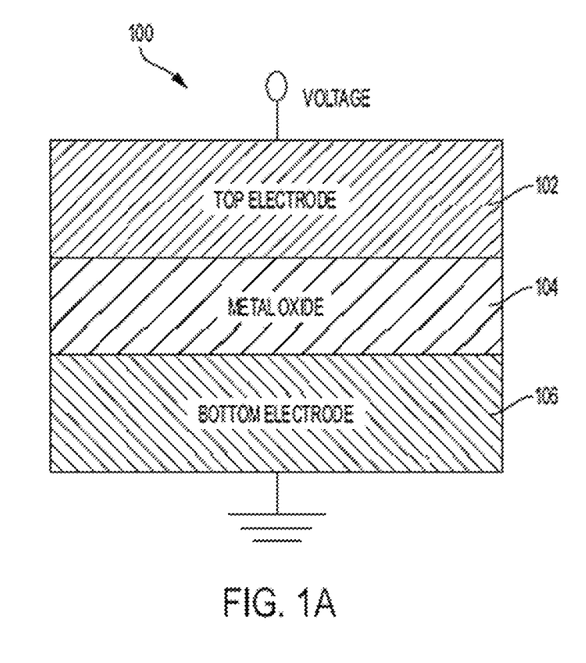
FIG. 1A depicts a simplified block diagram illustrating a cross-sectional view of a two-terminal resistive switching device (RSD), which can be used as a storage cell of an RRAM structure capable of incorporating aspects of the invention.

FIG. 1A depicts a simplified block diagram illustrating a cross-sectional view of a two-terminal RSD component 100, which can be used as a storage cell of an RRAM structure (e.g., crossbar array 200 shown in FIG. 2) capable of incorporating aspects of the invention. The RSD storage cell 100 includes a top electrode 102, metal oxide active region 104, and a bottom electrode 106, configured and arranged as shown. When a sufficient electrical signal (e.g., a voltage) is applied across the top/bottom electrodes 102, 106, the resistance of the metal oxide 104 can be switched from one resistance state to another. The metal oxide 104 retains its current resistance state until an appropriate electrical signal is applied across the top/bottom electrodes 102, 106 to change it.

Figure 1B:
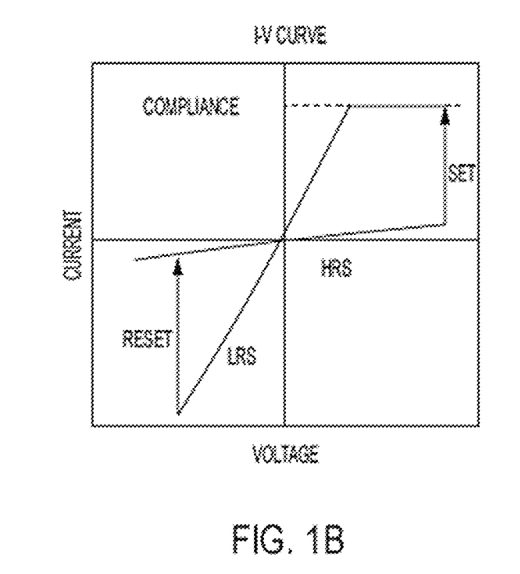
FIG. 1B depicts a diagram of an I-V curve illustrating the switching operation of the RSD component shown in FIG. 1A.

FIG. 1B depicts a diagram of an I-V curve illustrating the switching operation of the RSD storage cell 100. The operation principle of the RSD storage cell 100 is based on the reversible resistive switching (RS) between at least two stable resistance states, namely the high resistance state (HRS) and low resistance state (LRS), which occur in the metal oxide 104. In general, the operation that changes the resistance of the storage cell 100 from a high resistance state (HRS) to a low resistance state (LRS) is called a SET process, while the opposite process is defined as a RESET process. The specific resistance state (HRS or LRS) can be retained after the electric stress is cancelled, which indicates the nonvolatile nature of RRAM. For an initial write operation, a voltage larger than the SET voltage is needed in order to "turn on" the resistive switching behaviors of the metal oxide 104 for the subsequent cycles. This is often referred to as the forming process or the electroforming process.

Based on the electrical polarity's relationship between the SET process and the RESET processes, the resistive switching behaviors of the storage cell 100 can be divided into two modes, which are known as a unipolar mode (not shown) and a bipolar mode (shown in FIG. 1B). In the unipolar switching mode, both SET and RESET transitions are achieved by applying electrical voltages of the same polarity (e.g., a positive voltage). In the bipolar switching mode, SET and RESET transitions are executed by applying voltages of opposite polarities (e.g., a positive voltage SET and a negative voltage RESET). In both cases, the current is limited by a compliance level during the abrupt set transition in order to suitably control the size of current conducting filament (CF) and the corresponding LRS resistance value.

Figure 2:
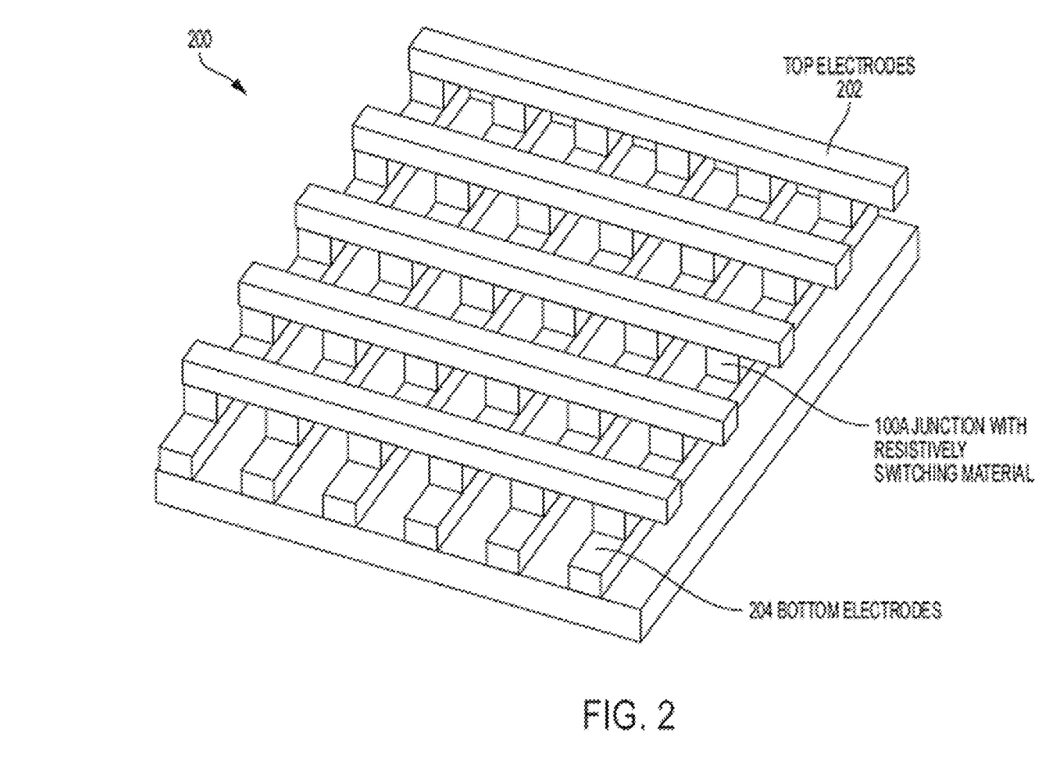
FIG. 2 depicts a simplified block diagram illustrating how the RSD component shown in FIG. 1A can be utilized as an addressable RRAM cells of an RRAM crossbar array capable of incorporating aspects of the invention.

FIG. 2 depicts a simplified block diagram illustrating how the RSD storage cell 100 shown in FIG. 1A can be utilized as an addressable cross point storage cell 100A of an RRAM crossbar array 200 capable of incorporating aspects of the invention. The array 200 includes perpendicular conductive top electrode lines 202 (e.g., wordline rows), conductive bottom electrode lines 204 (e.g., bitline columns), and RSD memory cells 100A at the intersection between each top electrode line 202 and bottom electrode line 204. In embodiments of the invention, the storage cell 100A can be configured to operate the same as the storage cell 100 shown in FIG. 1A. Each storage cell 100A can be accessed for read and write by biasing the corresponding top electrode line 202 and bottom electrode line 204.

Figure 3:
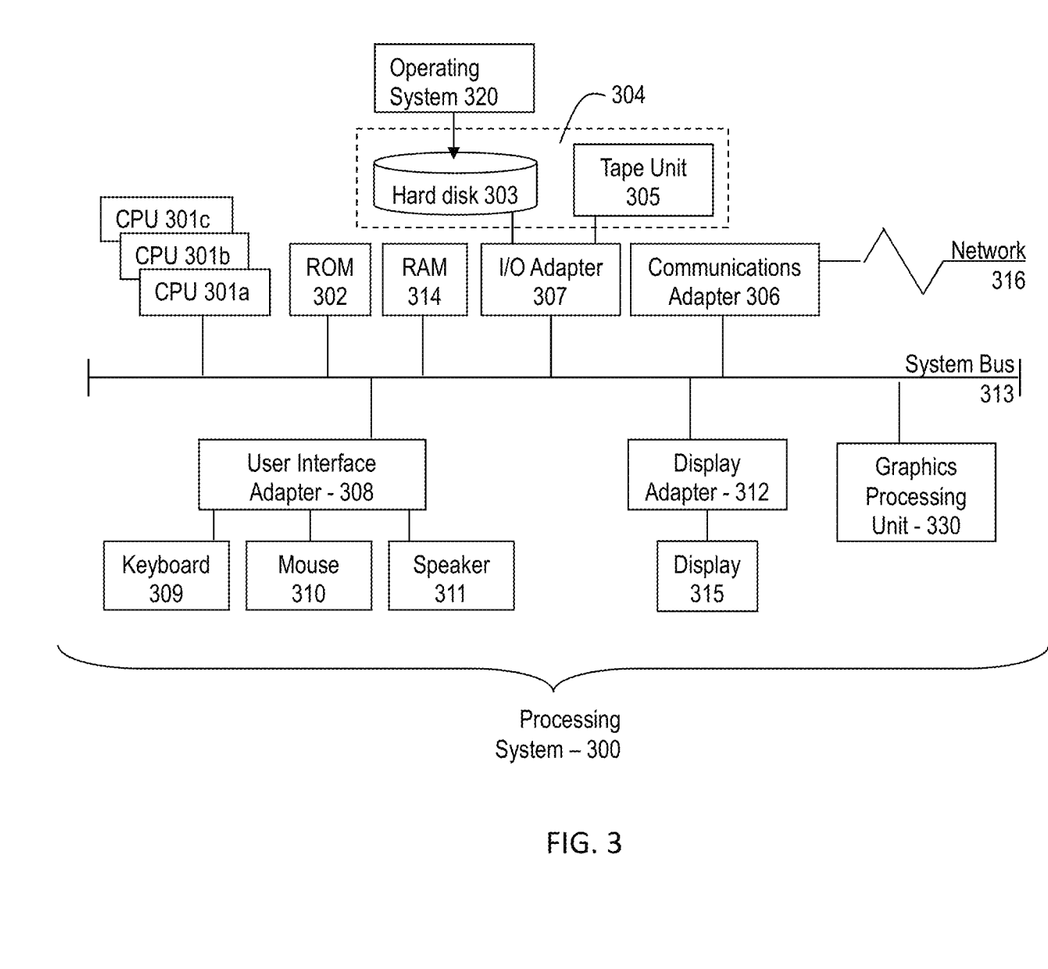
FIG. 3 is a block diagram illustrating one example of a processing system for practice of the teachings herein.

In one or more embodiments of the invention, the array 200 can be coupled to a processing system 300 such as the processing system 300 described below to implement an algorithm or process such as a machine learning model. Referring to FIG. 3, there is shown an embodiment of a processing system 300 for implementing the teachings herein. In this embodiment, the system 300 has one or more central processing units (processors) 301a, 301b, 301c, etc. (collectively or generically referred to as processor(s) 301). In one embodiment, each processor 301 may include a reduced instruction set computer (RISC) microprocessor. Processors 301 are coupled to system memory 314 and various other components via a system bus 313. Read only memory (ROM) 302 is coupled to the system bus 313 and may include a basic input/output system (BIOS), which controls certain basic functions of system 300.

FIG. 3 further depicts an input/output (I/O) adapter 307 and a network adapter 306 coupled to the system bus 313. I/O adapter 307 may be a small computer system interface (SCSI) adapter that communicates with a hard disk 303 and/or tape storage drive 305 or any other similar component. I/O adapter 307, hard disk 303, and tape storage device 305 are collectively referred to herein as mass storage 304. Operating system 320 for execution on the processing system 300 may be stored in mass storage 304. A network adapter 306 interconnects bus 313 with an outside network 316 enabling data processing system 300 to communicate with other such systems. A screen (e.g., a display monitor) 315 is connected to system bus 313 by display adaptor 312, which may include a graphics adapter to improve the performance of graphics intensive applications and a video controller. In one embodiment, adapters 307, 306, and 312 may be connected to one or more I/O busses that are connected to system bus 313 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 313 via user interface adapter 308 and display adapter 312. A keyboard 309, mouse 310, and speaker 311 all interconnected to bus 313 via user interface adapter 308, which may include, for example, a Super I/O chip integrating multiple device adapters into a single integrated circuit.

In exemplary embodiments, the processing system 300 includes a graphics processing unit 330. Graphics processing unit 330 is a specialized electronic circuit designed to manipulate and alter memory to accelerate the creation of images in a frame buffer intended for output to a display. In general, graphics processing unit 330 is very efficient at manipulating computer graphics and image processing, and has a highly parallel structure that makes it more effective than general-purpose CPUs for algorithms where processing of large blocks of data is done in parallel.

Thus, as configured in FIG. 3, the system 300 includes processing capability in the form of processors 301, storage capability including system memory 314 and mass storage 304, input means such as keyboard 309 and mouse 310, and output capability including speaker 311 and display 315. In one embodiment, a portion of system memory 314 and mass storage 304 collectively store an operating system to coordinate the functions of the various components shown in FIG. 3.

Figure 4:
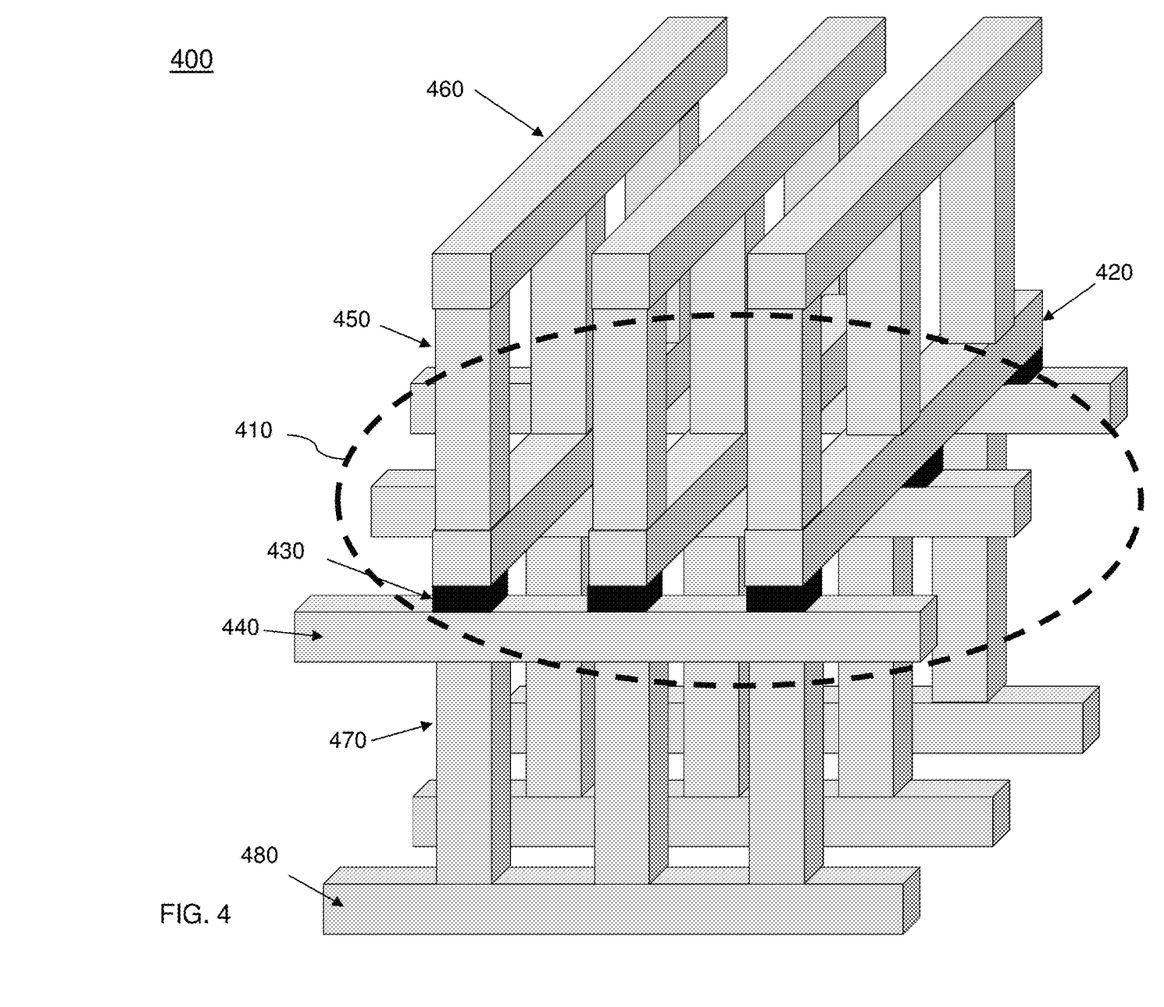
FIG. 4 depicts a crossbar array structure for multi-task learning in accordance with one or more embodiments of the invention.

Turning now to a more detailed description of aspects of the present invention, FIG. 4 depicts a crossbar array structure architecture 400 (hereinafter referred to as architecture 400) for multi-task learning according to one or more embodiments of the invention. The crossbar array structure 400 includes an array 410 of cross point devices 430 as provided in the outlined area shown in FIG. 4. The array 410 can be the array structure such as that shown in FIG. 2. Each cross point device 430 is coupled to a pair of conductive paths/metal lines where each pair of metal lines is associated with a task. The tasks can be performed by a processing system such as the processing system 300 of FIG. 3. For example, the metal layer 420 is a top metal layer for task 1, and the metal layer 440 is a bottom metal layer for task 1. The outputs of the pair of top metal lines 420 and the bottom metal lines 440 can be provided to a task of a software layer of a processing system for predicting an outcome for a machine learning model, such as that shown in FIG. 5. An additional task such as task 2 can leverage the weights that are stored in the array 410 of the shared hidden layer. The additional task 2 can be coupled to the array 410 by connecting an additional top layer 460 and a bottom layer 480 for the task 2 through the top vias 450 and bottom vias 470.

Also, in accordance with one or more embodiments of the invention, additional layers of top metal lines can be coupled to the first layer of top metal lines by a plurality of vias. Also, additional bottom layers of bottom metal lines can be coupled to the first layer of metal lines by a plurality of vias 450, 470. The additional pairs of metal lines allow for the connection and access to the weights of the array 410 which is the shared hidden layer. It should be understood that although only two pairs of metal layers are shown in FIG. 4, additional layers, vias, tasks, etc. can be used in addition to the example provided. The stacked structure of FIG. 4 includes 2 tasks for illustration purposes. However, more than 2 tasks can be realized by repeating the vias and metal line layers multiple times (downwards/upwards) according to the desired model.

Figure 5:
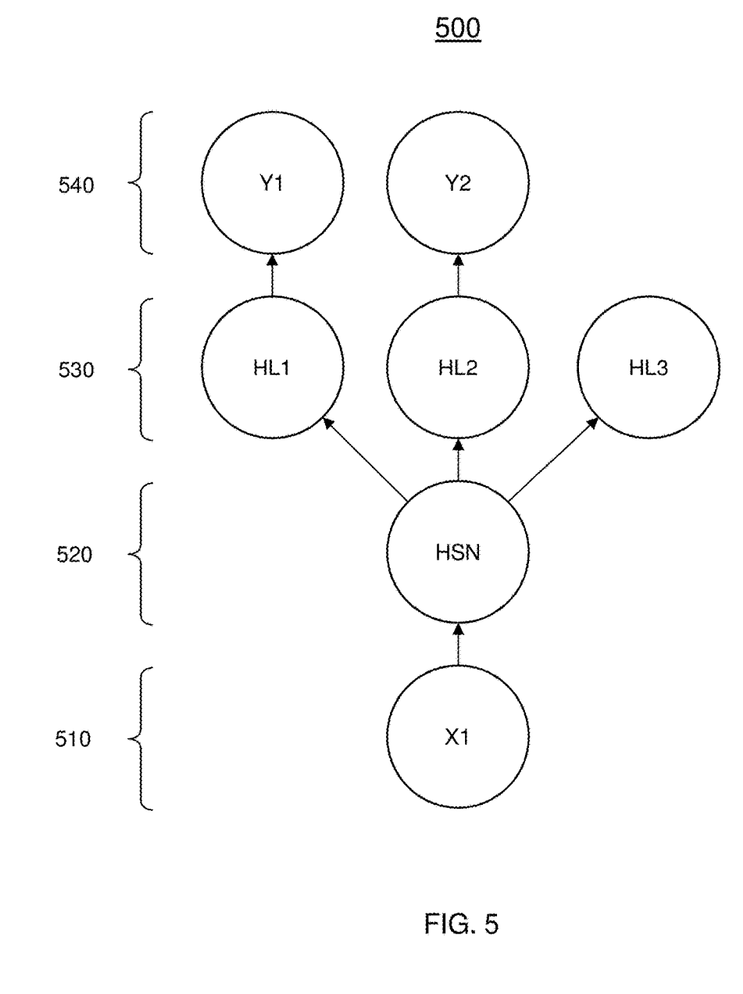
FIG. 5 depicts an example of a multitask learning model in accordance with one or more embodiments of the invention.

In FIG. 5, a multi-task learning model 500 in accordance with one or more embodiments of the invention is shown. The model 500 depicts a plurality of nodes/neurons for performing a prediction according to the input data and weights provided to each of the nodes. At each node a computation is performed that combines the input from the data with a set of coefficients, or weights, that either amplify or dampen that input, thereby assigning significance to inputs for the task the algorithm is trying to learn. The output of a node of a first layer serves as the input to a node of the subsequent layer. A layer includes a set of data that is simultaneously fed to the subsequent layer. The weights and features are used to determine how the model classifies and clusters the input. The connections between each node and each layer are associated with a parameter such as a weight/bias used to predict an outcome of the model 500. The parameters of the model 500 can be optimized using feedforward and back propagation techniques to further optimize the predictions of the model 500. During the feedforward propagation process, each of the nodes performs computations on the input data and the weights to predict an outcome and the predicted outcome is compared to a known value to determine an error. Next, the results can be used to perform back propagation to optimize the values of the weights that are used in the multi-task learning model. In one or more embodiments of the invention, the resistivity of each of the cross point device represents the weight and can be configured/re-configured according to the results of the error. The process is repeated until the error is reduced to an acceptable level or has converged to a particular value. It should be understood that other machine learning techniques can be used to improve the predictions of the model 500.

As shown in FIG. 5, an input layer 510 includes an input node x. The example model 500 includes tasks that share a common input but involve different target random variables where the model 500 is executed in a software layer of a processing system such as that shown in FIG. 4. The input node x is used to predict the output (Y1N, Y2N) of output layer 540 or expected output labels according to the parameters provided to each node of the model 500.

Also shown in FIG. 5 are hidden layer nodes (HL1, HL2, HL3) of the hidden layer 530. The hidden layer nodes (HL1, HL2, HL3) are nodes that neither see nor act upon the outside world directly. These nodes can represent interneurons that communicate only with other neurons and are used in predicting the output label of the model 400.

In multi-task learning models, there are some parameters that are shared across a plurality of tasks. As shown in FIG. 5, the hidden shared node (HSN) can be shared across a plurality of tasks, while task-specific parameters can be learned on top of those yielding a shared representation HSN. In one or more embodiments of the invention, a shared hidden layer 520 includes the HSN that resides between a first layer such as the input layer 510 and another layer such as the hidden layer 530. The HSN is shared among the three nodes of the hidden layer 530. Although, only a single hidden layer 530 is shown in FIG. 5, it should be understood that the any number of hidden layers can be used.

Predicted outcome at output nodes Y(1) and Y(2) are determined using the HSN connection between the input layer 510 and the hidden layer 530. The architecture of the HSN is implemented in the RRAM crossbar structure which is discussed with reference to FIG. 4. Also, it should be understood that other machine learning models can be used in accordance with one or more embodiments of the invention. The techniques described herein implement the HSN of the shared hidden layer 520 in a RRAM crossbar array structure. As discussed with reference to FIG. 6 the shared hidden layer 520 is implemented in a physical hardware layer and the tasks can be implemented in one or more software layers of a processing system. The crossbar array structure includes metal layers and connections to couple each of the cross point devices, representing the weights/biases of the nodes, to the plurality of tasks of the model 500.

Figure 6:
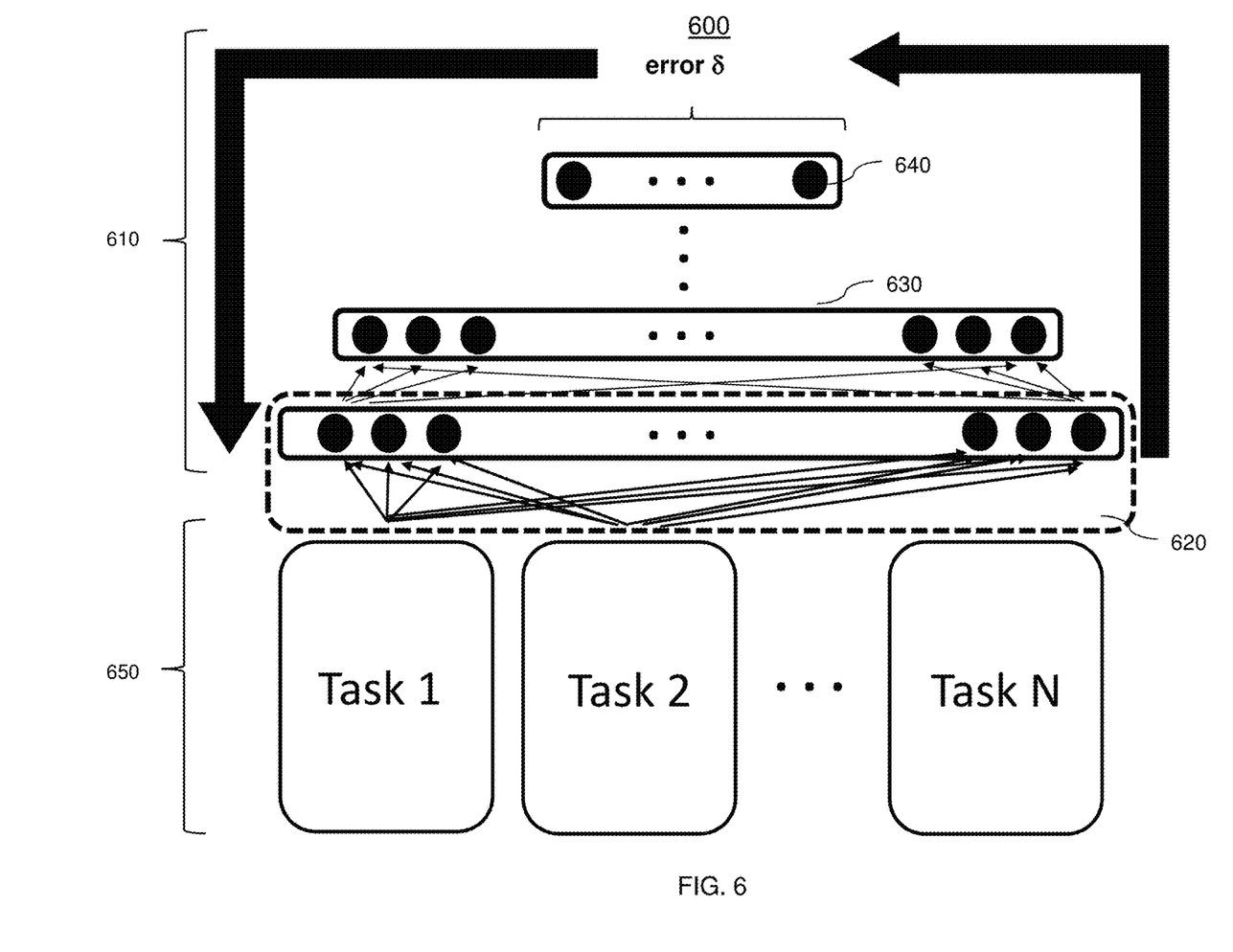
FIG. 6 depicts an example of a multitask learning model in accordance with one or more embodiments of the invention.

In FIG. 6, the crossbar array structure 600 for multi-task learning in accordance with one or more embodiments of the invention is shown. FIG. 6 depicts a plurality of tasks (Task 1, 2 . . . N) where each task is coupled to one or more layers of the multi-task learning architecture. The multi-task learning architecture includes a plurality of hardware layers 610 for performing online training. The hardware layer 610 includes a plurality of layers arranged in an ordered sequence. The first layer 620 is a shared hidden layer such as that shown in FIG. 5 (element 520). The hardware layer 610 can also include one or more hidden layers 630. As shown, an output layer 640 is included in the hardware layer 610 which can provide an output that is used for one or more tasks 1-N.

FIG. 6 also includes a software layer 650 for performing the multi-task learning algorithm which can be executed in a processing system (not shown). The software layer 650 includes the tasks to be executed. The shared hidden layer 620 is represented in hardware and provides physical connections between the hardware layer 610 and the software layer 650 to execute the hybrid multi-task learning. Each of the nodes of the shared hidden layer 620 is coupled to each node of the other layers to allow the weights to be physically shared at with each node. This technique eliminates the need to perform a fetch operation in memory to provide a weight in the multi-task learning process and increases the multi-task learning process. Each node of the shared hidden layer 620 can be coupled to the nodes of the plurality of other layers using vias, interconnects, or other types of connections. Although two tasks are shown, more tasks can be realized by repeating via and metal line layers multiple times downwards and upwards. In addition, each layer of the hardware layer can be implemented in a RRAM and can be further coupled to another layer that is implemented as an RRAM.

Figure 7:
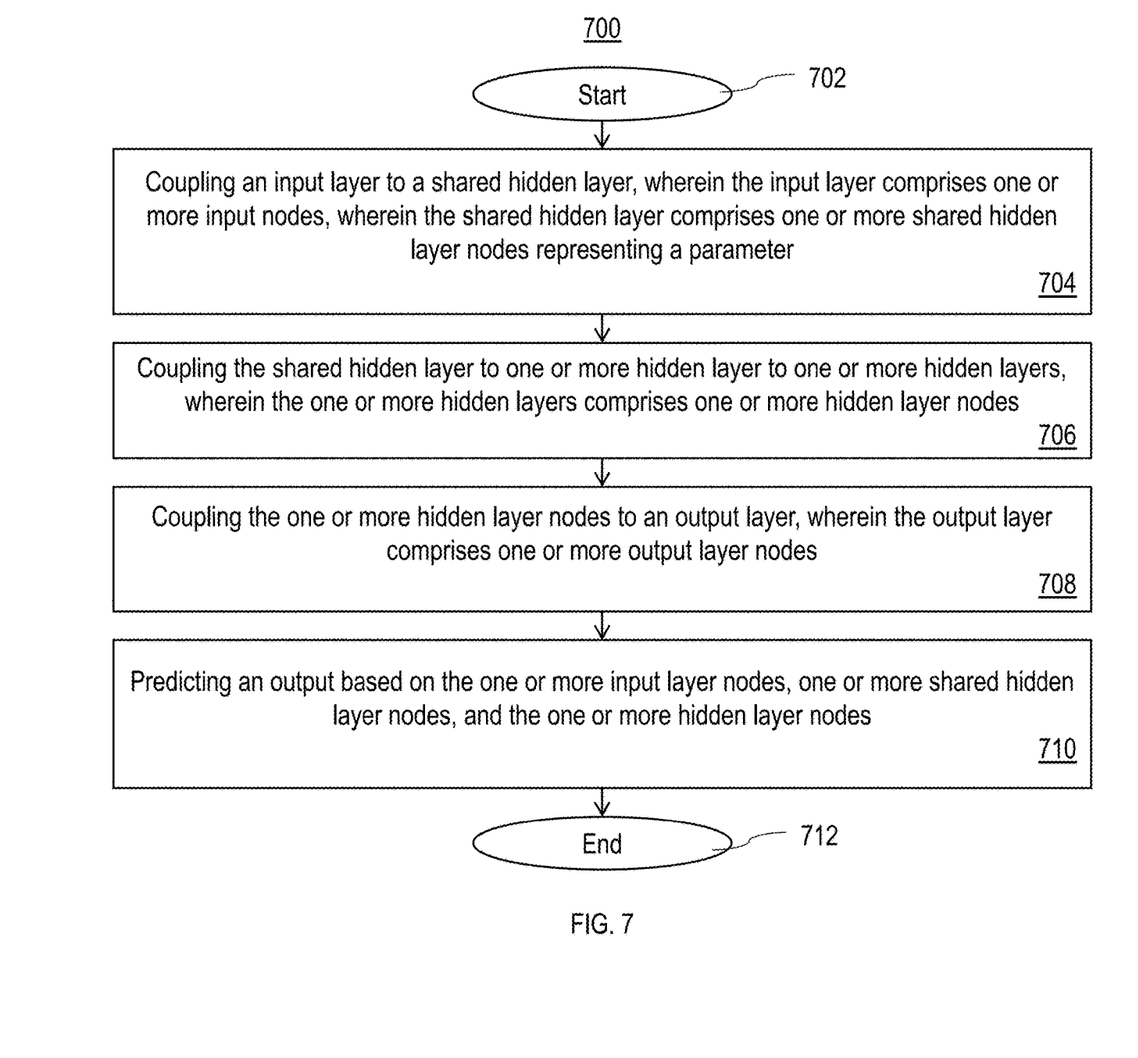
FIG. 7 depicts a flowchart of a method for operating a crossbar array structure for multi-task learning in accordance with one or more embodiments of the invention.

FIG. 7 depicts a flowchart of a method 700 for operating a crossbar array structure for multi-task learning in accordance with one or more embodiments of the invention. The method 700 begins at block 702 and proceeds to block 704 which provides for coupling an input layer to a shared hidden layer, wherein the input layer includes one or more input nodes, wherein the shared hidden layer includes one or more shared hidden layer nodes representing a parameter. In the multi-task learning architecture, each node of the input layer is coupled to each node in the shared hidden layer. The nodes of the shared hidden layer represent a weight/bias of the connections between the nodes of the layers. The method 700 proceeds to block 706 which provides for coupling the shared hidden layer to one or more hidden layers, wherein the one or more hidden layers includes one or more hidden layer nodes. At block 708 provides for coupling the one or more hidden layer nodes to an output layer, wherein the output layer includes one or more output layer nodes. At block 710, the method 700 provides for predicting an output based on the one or more input layer nodes, one or more shared hidden layer nodes, and the one or more hidden layer nodes. Responsive to predicting the output, each of the outputs is compared to the expected outputs and an error can be calculated. The error is used to update the weights/bias of the shared hidden layer nodes to optimize the weights/bias for predicting outputs. During a training phase of the machine-learning algorithm uses forward and back propagation in a supervised learning model. The forward propagation is used to determine an error at the output, and the back propagation is used to update the weights of the hidden shared layer based on the error to optimize the parameters. The method 700 ends at block 712. The method 700 can be repeated periodically or responsive to a command from an administrator.

The techniques described herein improve over the prior art by reducing the time delay by physically sharing the weights across different tasks in a model. The weights that are configured in the RRAM crossbar array can be shared with multiple bottom metal lines and top metal lines through vias landing on each cross point, where one or more pairs of metal lines can be used. The metal lines are connected to periphery circuits to perform a separate task at each layer. There is no footprint penalty for implementing the RRAM crossbar array.

The shared weights are not required to be moved between a memory and the corresponding processing unit due to the physical connections. The shared weights are implemented in the RRAM using the cross point devices, where the resistivity associated with each of the cross point devices physically represent the weight and are physically coupled to each of the nodes of the multi-task learning model. Because the weights are shared among the tasks and layers, they are not required to be transferred in and out of memory slowing down the processing, the performance of the machine-learning models can be increased by implementing the hardware solution of the crossbar array structure.

The techniques described herein are used in the fabrication of IC chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Similarly, the term "coupled" and variations thereof describes having a communications path between two elements and does not imply a direct connection between the elements with no intervening elements/connections between them. All of these variations are considered a part of the specification. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrase "selective to," such as, for example, "a first element selective to a second element," means that the first element can be etched and the second element can act as an etch stop.

The term "conformal" (e.g., a conformal layer) means that the thickness of the layer is substantially the same on all surfaces, or that the thickness variation is less than 15% of the nominal thickness of the layer.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A resistive random access memory (RRAM) crossbar array in a multi-task learning system with hardware acceleration, the RRAM crossbar array comprising:
   one or more cross point devices coupled to a first pair of metal lines, wherein the first pair of metal lines is associated with a first task of the multi-task learning system, wherein a resistivity of each cross point device of the one or more cross point devices represent a parameter of a connection in the multi-task learning system; and
   a second pair of metal lines is associated with a second task of the multi-task learning system, wherein the first pair of metal lines is coupled to the second pair of metal lines,
   wherein the RRAM crossbar array is coupled to a first top layer and a first bottom layer coupled to the RRAM crossbar array via the first pair of metal lines; and a second top layer and a second bottom layer coupled to the RRAM crossbar array via the second pair of metal lines, wherein the first top layer, the first bottom layer, the second top layer, and the second bottom layer access weights from the RRAM crossbar array.

2. The RRAM crossbar array of claim 1, wherein the first pair of metal lines is coupled to the second pair of metal lines by one or more vias.

3. The RRAM crossbar array of claim 1, wherein the parameter is a weight or bias associated with the one or more hidden layer nodes of the one or more hidden layer nodes.

4. The RRAM crossbar array of claim 1, wherein the RRAM crossbar array is a shared hidden layer, wherein the shared hidden layer comprises the one or more cross point devices, wherein the shared hidden layer is coupled to an input layer and one or more hidden layers comprising one or more nodes.

* * * * *